(12) United States Patent
Oyama

(10) Patent No.: US 11,498,584 B2
(45) Date of Patent: Nov. 15, 2022

(54) INTERSECTION START JUDGMENT DEVICE

(71) Applicant: SUBARU CORPORATION, Tokyo (JP)

(72) Inventor: Hajime Oyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 282 days.

(21) Appl. No.: 16/787,641

(22) Filed: Feb. 11, 2020

(65) Prior Publication Data

US 2020/0310427 A1    Oct. 1, 2020

(30) Foreign Application Priority Data

Mar. 29, 2019 (JP) .............................. JP2019-066211

(51) Int. Cl.
  *B60W 60/00* (2020.01)
  *B60W 30/18* (2012.01)
  *B60W 50/14* (2020.01)

(52) U.S. Cl.
  CPC .... *B60W 60/001* (2020.02); *B60W 30/18154* (2013.01); *B60W 30/18159* (2020.02); *B60W 50/14* (2013.01); *B60W 2520/04* (2013.01); *B60W 2554/4041* (2020.02); *B60W 2554/4042* (2020.02); *B60W 2710/18* (2013.01); *B60W 2720/106* (2013.01)

(58) Field of Classification Search
  CPC ......... B60W 60/001; B60W 30/18154; B60W 30/18159; B60W 50/14; B60W 2520/04; B60W 2554/4041; B60W 2554/4042; B60W 2710/18; B60W 2720/106
  See application file for complete search history.

(56) References Cited

U.S. PATENT DOCUMENTS

| | | | | |
|---|---|---|---|---|
| 8,718,906 B2* | 5/2014 | Miller | .............. | G08G 1/096791 701/117 |
| 9,459,623 B1* | 10/2016 | Raghu | ................... | G01S 13/931 |
| 10,877,485 B1* | 12/2020 | Martin | ................. | G05D 1/0088 |
| 2017/0205825 A1* | 7/2017 | Wang | ................... | G05D 1/0289 |
| 2020/0394911 A1* | 12/2020 | Harmel | ........... | B60W 60/00276 |

FOREIGN PATENT DOCUMENTS

JP    2010-095078 A    4/2010

* cited by examiner

*Primary Examiner* — Jeffrey C Boomer
(74) *Attorney, Agent, or Firm* — McDermott Will & Emery LLP

(57) ABSTRACT

An intersection start judgment device judges whether to start an own vehicle at an intersection at which vehicles in all directions need to temporarily stop. The device includes an autonomous sensor, a driving environment recognizer, a locator, and a controller. The autonomous sensor is disposed on the own vehicle and configured to detect a driving environment in front of the own vehicle. The driving environment recognizer is configured to recognize, with the autonomous sensor, the driving environment of the own vehicle. The locator is configured to calculate a location of the own vehicle with map information and a global navigation satellite system; and a controller configured to give, in a case where the own vehicle stopped temporarily at the intersection, start permission to the own vehicle when the number, counted by the driving environment recognizer, of other vehicles that are already stopping at the intersection becomes zero by subtraction counting.

4 Claims, 4 Drawing Sheets

INTERSECTION START JUDGMENT DEVICE

CROSS-REFERENCE TO RELATED APPLICATIONS

This application claims benefit of Japanese Application No. 2019-066211 filed on Mar. 29, 2019, the entire contents of which are hereby incorporated by reference.

BACKGROUND

The technology relates to an intersection start judgment device configured to judge a start priority of a vehicle at an intersection, particularly at a "4-WAY STOP" intersection.

There has been known a vehicular stereo camera device that includes a right-and-left pair of stereo cameras mounted on a vehicle, and captures images of a driving environment ahead of the own vehicle by using the stereo cameras, thereby recognizing a preceding vehicle and various obstacles, and measuring a distance between the own vehicle and the objects.

With such a vehicular stereo camera device, various proposals to perform vehicle control such as driver assistance, automatic driving, and the like by using recognized images have been made. For example, Japanese Unexamined Patent Application Publication (JP-A) No. 2010-095078 discloses a course prediction device configured to predict a course of a moving object based on a movement state of the moving object such as a vehicle.

SUMMARY

An aspect of the technology provides an intersection start judgment device that judges whether to start an own vehicle at an intersection at which vehicles in all directions need to temporarily stop. The device includes an autonomous sensor, a driving environment recognizer, a locator, and a controller. The autonomous sensor is disposed on the own vehicle and configured to detect a driving environment in front of the own vehicle. The driving environment recognizer is configured to recognize, with the autonomous sensor, the driving environment of the own vehicle. The locator is configured to calculate a location of the own vehicle with map information and a global navigation satellite system; and a controller configured to give, in a case where the own vehicle stopped temporarily at the intersection, start permission to the own vehicle when the number, counted by the driving environment recognizer, of other vehicles that are already stopping at the intersection becomes zero by subtraction counting.

An aspect of the technology provides an intersection start judgment device that judges whether to start an own vehicle at an intersection at which vehicles in all directions need to temporarily stop. The device includes an autonomous sensor, and circuitry. The autonomous sensor is disposed on the own vehicle and configured to detect a driving environment in front of the own vehicle. The circuitry is configured to recognize, with the autonomous sensor, the driving environment of the own vehicle. The circuitry is configured to calculate a location of the own vehicle with map information and a global navigation satellite system. In a case where the own vehicle stopped temporarily at the intersection, the circuitry is configured to count the number of other vehicles that are already stopping at the intersection and give start permission to the own vehicle when the counted number becomes zero by subtraction counting.

BRIEF DESCRIPTION OF THE DRAWINGS

The accompanying drawings are included to provide a further understanding of the disclosure and are incorporated in and constitute apart of this specification. The drawings illustrate example an embodiment and, together with the specification, serve to explain the principles of the disclosure.

DETAILED DESCRIPTION

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

In countries such as the United States of America, there are intersections without traffic lights where a traffic rule referred to as "4-WAY STOP" is applied. This traffic rule at the "4-WAY STOP" intersection is such that vehicles in all directions need to temporarily stop, and among the vehicles, a vehicle having arrived at the intersection earlier is given the right to move. The other vehicles must stop and wait until the vehicle having the right-of-way has finished its movement.

Vehicle control based on the above-mentioned special traffic rule cannot be performed by a course prediction device of related art as disclosed in JP-A No. 2010-95078.

It is desirable to provide an intersection start judgment device configured to judge whether to start an own vehicle at an intersection where a traffic rule for "4-WAY STOP" is applied.

Figure 1:
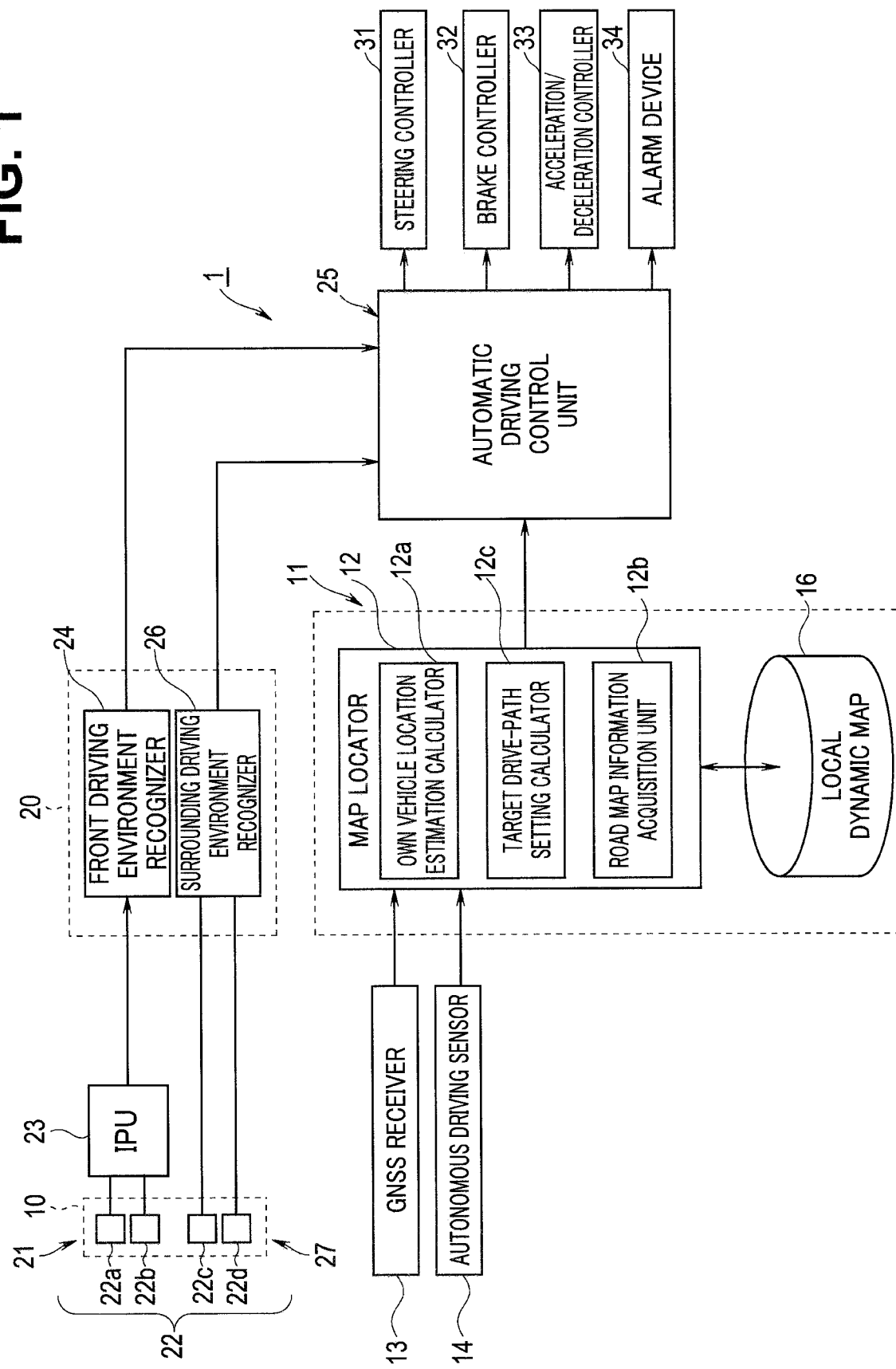
FIG. 1 is a functional block diagram illustrating a configuration of an automatic driving support system equipped with a vehicular stereo camera device.

Hereinafter, an embodiment of the technology will be described with reference to the drawings. An automatic driving support system 1 including an intersection start judgment device illustrated in FIG. 1 is mounted on an own vehicle M (see FIG. 2). The automatic driving support system 1 includes a locator unit 11 configured to detect a location of the own vehicle, and an autonomous sensor unit 22 as an autonomous detector constituted of a stereo camera device 21 configured to recognize a driving environment in front of the own vehicle M, and a radar device 27.

In the locator unit 11 and the autonomous sensor unit 22, to deal with a case in which one of these units malfunctions, a redundant system configured to temporarily continue the automatic driving support by the other unit is constructed. The automatic driving support system 1 constantly monitors whether the shape of a road on which the own vehicle is currently traveling is the same between the locator unit 11 and the autonomous sensor unit 22, and continues the automatic driving support in the case where the shape of the road detected by these units is the same.

The locator unit 11 estimates the location of the own vehicle M (own vehicle location) on a road map, and acquires road map data ahead of the own vehicle location. On the other hand, the stereo camera device 21 of the autonomous sensor unit 22 obtains a road curvature at the center of the lane lines for dividing right and left sides of the driving lane of the own vehicle M, and detects a lateral position deviation in a vehicle width direction of the own vehicle M while taking the center of the left and right lane markers dividing the lane as a reference.

Further, the stereo camera device 21 recognizes a preceding vehicle in front of the own vehicle M, three-dimensional objects including moving objects such as a pedestrian and a two wheeler (bicycle, motor cycle) attempting to cross immediately ahead of the own vehicle M, a signal indication (lighting color), a road sign, and the like.

The locator unit 11 includes a map locator calculator 12, and a high-accuracy road map database 16 as a storage unit. The map locator calculator 12, and a front driving environment recognizer 24 and an automatic driving controller 25 to be described later, are constituted of a well-known microcomputer including a CPU, a RAM, a ROM, a nonvolatile storage unit and the like, and peripheral devices thereof, and programs to be executed by the CPU, fixed data such as data tables, and the like are stored in the ROM in advance.

A Global Navigation Satellite System (GNSS) receiver 13 and an autonomous driving sensor 14 are coupled to the input side of the map locator calculator 12.

The GNSS receiver 13 receives positional signals transmitted from a plurality of positioning satellites. The autonomous driving sensor 14 enables autonomous driving in an environment where the reception sensitivity from the GNSS satellite is low, like in a case of driving in a tunnel, so that the positional signal cannot be effectively received, and is constituted of a vehicle speed sensor, a yaw rate sensor, a longitudinal acceleration sensor, and the like.

That is, the map locator calculator 12 performs localization from a moving distance and a direction based on a vehicle speed detected by the vehicle speed sensor, a yaw rate (yaw angular speed) detected by the yaw rate sensor, longitudinal acceleration detected by the longitudinal acceleration sensor, and the like.

The map locator calculator 12 includes an own vehicle location estimation calculator 12a as a function to estimate an own vehicle location, a map information acquisition unit 12b that specifies a current location of the own vehicle M by map-matching the estimated own vehicle location on the road map and then acquires road map information including environmental information around the specified location, and a target drive-path setting calculator 12c configured to set a drive path as a target (target drive-path) of the own vehicle M.

The high-accuracy road map database 16 is configured on a large capacity storage medium such as an HDD, and stores therein well-known road map information (local dynamic map) with high accuracy. This high-accuracy road map information has a hierarchical structure in which additional map information necessary for supporting the automatic driving is superimposed on a static information layer which is the lowermost layer as a base.

The above-discussed map information acquisition unit 12b acquires the current location and the front road map information from the road map information stored in the high-accuracy road map database 16. The road map information contains surrounding environment information. The surrounding environment information contains not only static location information such as road types (a general road, expressway, and the like), road shapes, left and right lane markers dividing the lane, road signs, stop lines, intersections and traffic lights, but also dynamic location information such as traffic jam information and traffic restrictions due to car accidents or construction works.

For example, based on a destination set by the driver for automatic driving, route map information from the own vehicle location (current location) estimated by the own vehicle location estimation calculator 12a to the destination is acquired from the road map information, and the acquired route map information (lane data on the route map and peripheral information thereof) is transmitted to the own vehicle location estimation calculator 12a.

The own vehicle location estimation calculator 12a acquires location coordinates of the own vehicle M based on a positional signal received by the GNSS receiver 13, performs map-matching of the location coordinates on the root map information to estimate the own vehicle location (current location) on the road map and specify the driving lane, acquires a road shape of the driving lane stored in the route map information, and sequentially stores such data.

In addition, in an environment where an effective positional signal cannot be received from the positioning satellite due to a drop in sensitivity of the GNSS receiver 13 like in a case of driving in a tunnel, the own vehicle location estimation calculator 12a switches the automatic driving support to autonomous navigation and performs localization by the autonomous driving sensor 14.

The target drive-path setting calculator 12c first sets a target drive-path for automatic driving of the own vehicle M along the lane markers based on the current location subjected to map-matching by the map information acquisition unit 12b. When the driver inputs a destination, the target drive-path is set along a driving route connecting the current location and the destination.

The target drive-path is set in a range from several hundred meters to several kilometers ahead of the own vehicle M, and is sequentially updated during the driving. The target drive-path set by the target drive-path setting calculator 12c is read by the automatic driving controller 25.

The stereo camera device 21 is provided with first and second cameras 22a and 22b, each of which is an autonomous sensor and serves as an image-capturing unit to capture an image on the front side of the own vehicle M, an image processing unit (IPU) 23, and the front driving environment recognizer 24. In one embodiment, the front driving environment recognizer 24 may serve as a "driving environment recognizer".

Figure 2:
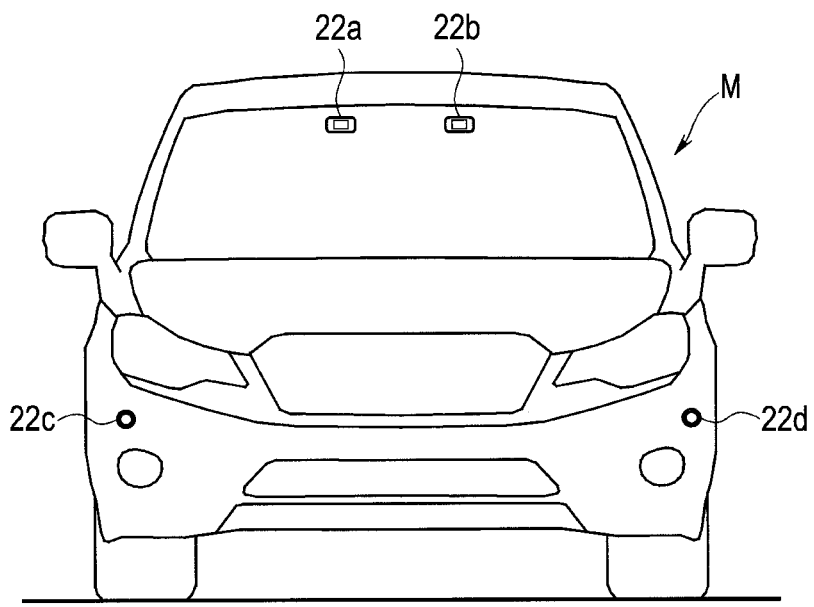
FIG. 2 is a front view of a vehicle on which a stereo camera device is mounted.

The first and second cameras 22a and 22b are fixed to positions in the same row in a lateral direction on the upper side close to the windshield at the front of the interior of the own vehicle M, as illustrated in FIG. 2.

A plurality of images captured by the first and second cameras 22a and 22b is subjected to predetermined image processing in the IPU 23, and is output to the front driving environment recognizer 24.

Based on the stereo image, the front driving environment recognizer 24 recognizes a road shape of the drive-path (own vehicle drive-path) on which the own vehicle M is traveling, presence/absence of a preceding vehicle traveling in front of the own vehicle M, three-dimensional objects including moving objects such as a pedestrian and a two wheeler (bicycle, motor cycle) attempting to cross immediately ahead of the own vehicle M, a signal indication (lighting color), a road sign, and the like.

Then, the distance to the object is calculated from the focal length of each of the cameras, the baseline length between the cameras, and the parallax of the same object by using the principle of triangulation. Since the method for recognizing an object based on a stereo image and the method for calculating a distance to the object are known techniques, detailed description thereof will be omitted.

The radar device 27 is provided with first and second sensors 22c and 22d to be autonomous sensors as detectors achieved by various radars of sensing devices such as millimeter-wave radar, laser radar and Light Detection and Ranging (LIDER), and a surrounding driving environment recognizer 26 that recognizes surrounding environment information such as a moving object around the own vehicle M based on signals from the first and second sensors 22c and 22d.

The first and second sensors 22c and 22d are disposed on both sides of the front side of the bumper, so as to detect the surrounding environment information in the front direction and the right and left directions of a predetermined angular range of the own vehicle M.

In the present embodiment, the first and second cameras 22a, 22b and the first and second sensors 22c, 22d constitute an autonomous sensor unit 10 as a detector, and the front driving environment recognizer 24 and the surrounding driving environment recognizer 26 constitute a driving environment recognizer 20. In one embodiment, the driving environment recognizer 20 may serve as a "driving environment recognizer".

The target drive-path setting calculator 12c of the map locator calculator 12, the front driving environment recognizer 24 of the stereo camera device 21, and the surrounding driving environment recognizer 26 of the radar device 27 are coupled to the input side of the automatic driving controller 25.

Further, to the output side of the automatic driving controller 25, a steering controller 31 configured to drive the own vehicle M along the target drive-path, a brake controller 32 configured to decelerate the own vehicle M by using a forced brake, an acceleration/deceleration controller 33 configured to control the vehicle speed of the own vehicle M, and an alarm device 34 are coupled.

The automatic driving controller 25 performs predetermined control on the steering controller 31, the brake controller 32, and the acceleration/deceleration controller 33, and causes the own vehicle M to automatically travel along a target drive-path on the road map set by the target drive-path setting calculator 12c based on a positional signal indicating the own vehicle location received by the GNSS receiver 13. At this time, the automatic driving controller 25 performs, based on the front driving environment recognized by the front driving environment recognizer 24, the known Adaptive Cruise Control (ACC) and Active Lane Keep (ALK), to cause the own vehicle M to follow the preceding vehicle, when a preceding vehicle is detected, and cause the own vehicle M to travel within the speed limit, when a preceding vehicle is not detected. Further, when a moving object attempting to cross immediately ahead of the own vehicle M is detected, the automatic driving controller 25 actuates, the brake controller 32 to stop the own vehicle M.

Figure 3:
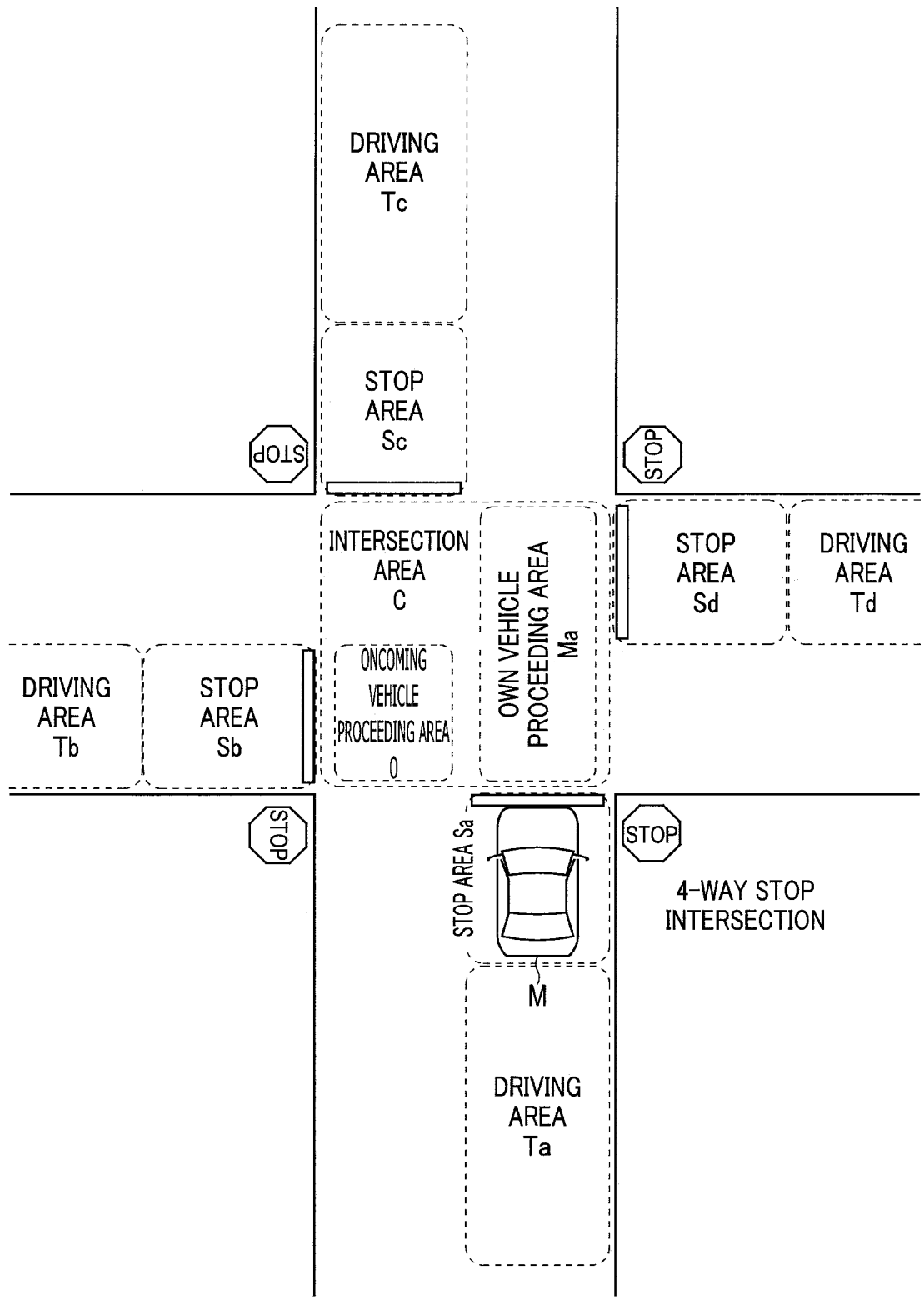
FIG. 3 is a schematic diagram illustrating a "4-WAY STOP" intersection.

The high-accuracy road map database 16 stores location information of all the "4-WAY STOP" intersections on the map, as illustrated in FIG. 3.

When the own vehicle M arrives at a "4-WAY STOP" intersection and stops, various types of areas with respect to a proceeding direction of the own vehicle M, which are obtained by dividing the "4-WAY STOP" intersection area, are set in the automatic driving controller 25 based on the image transmitted from the high-accuracy road map database 16 and the IPU 23.

The set various types of areas are as follows: first, an intersection area C within the "4-WAY STOP" intersection; an own vehicle proceeding area Ma, which is a vehicle passage area within the intersection area C on the proceeding direction side of the own vehicle M; and an oncoming vehicle proceeding area O, which is a vehicle passage area within the intersection area C on the proceeding direction side of an oncoming vehicle and which the area close to the own vehicle M side in the intersection area C, that is, about half the area on the proceeding direction side of the oncoming vehicle.

On the roads crossing the "4-WAY STOP" intersection, there are set first to fourth stop areas Sa, Sb, Sc, and Sd at which vehicles to enter into the intersection need to stop, and first to fourth driving areas Ta, Tb, Tc, and Td on a backward side relative to the first to fourth stop areas Sa, Sb, Sc, and Sd, respectively.

Figure 4:
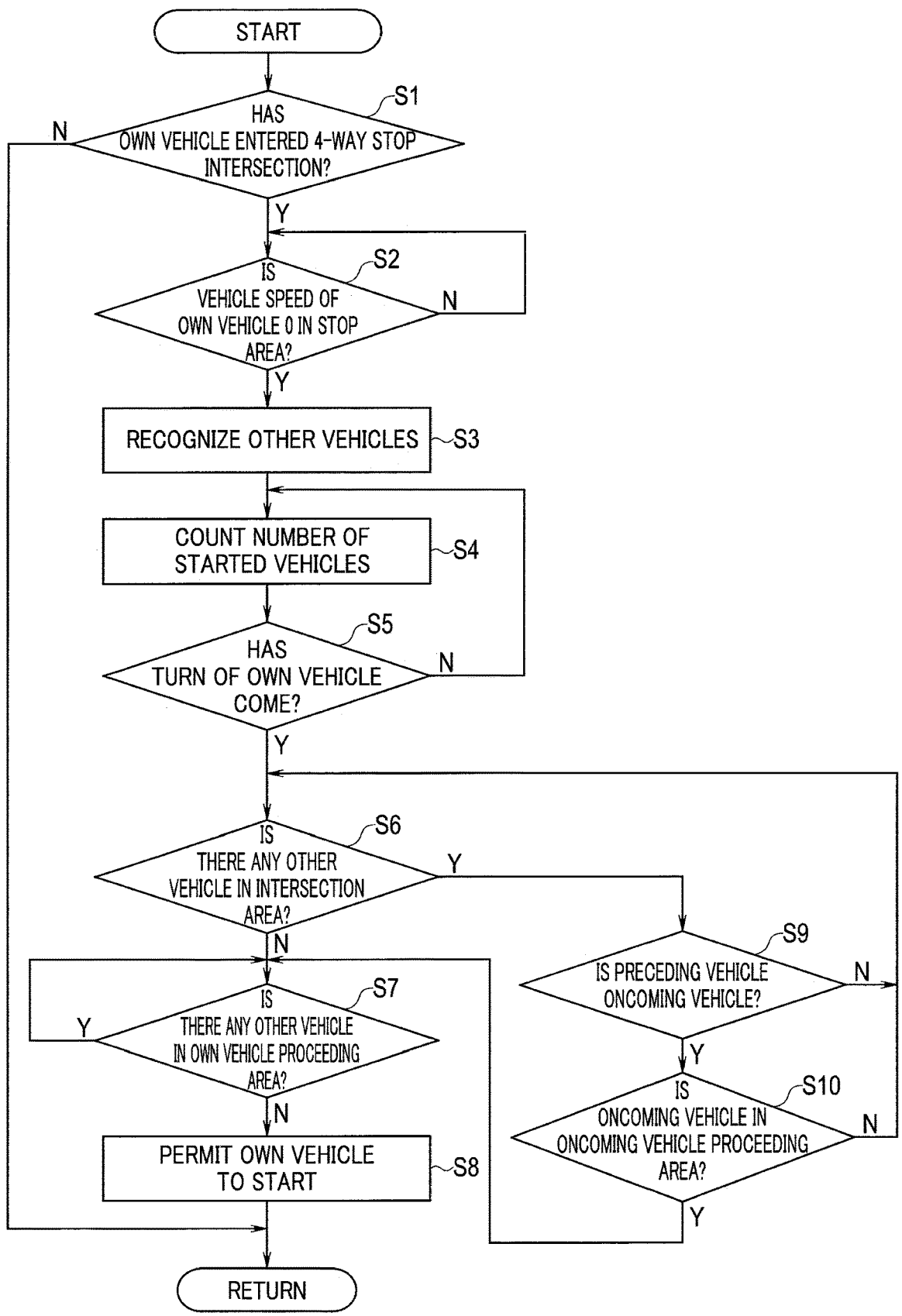
FIG. 4 illustrates a control flow of an intersection start judgment device.

An example of control to be performed by the automatic driving controller 25 when the own vehicle M enters an intersection where the traffic rule referred to as "4-WAY STOP" is applied, will now be described with reference to FIG. 3 and a flowchart in FIG. 4.

First, it is judged whether the own vehicle M has entered the "4-WAY STOP" intersection from the own vehicle location received by the GNSS receiver 13 based on the road map information (step S1). In a case where the own vehicle M has not entered the "4-WAY STOP" intersection yet, the processing in step S1 is repeated.

Next, when the own vehicle M has entered the "4-WAY STOP" intersection, it is judged whether the vehicle speed of the own vehicle M in the first stop area Sa illustrated in FIG. 3 is zero (step S2). In other words, it is judged whether the own vehicle M is stopping within the first stop area Sa.

The processing in step S2 is repeated until the vehicle speed of the own vehicle M in the first stop area Sa becomes zero. That is, the processing in step S2 is repeated until the own vehicle M comes into a state of stopping in the first stop area Sa.

When the vehicle speed of the own vehicle M in the first stop area Sa becomes zero, other vehicles to enter the "4-WAY STOP" intersection are recognized (step S3). In this processing, other vehicles are recognized based on the image information transmitted from the IPU 23 to the front driving environment recognizer 24 and also based on the surrounding environment information transmitted from the first and second sensors 22c and 22d to the surrounding driving environment recognizer 26. At this time, the number of zero to three of other vehicles entered into the intersection and are currently stopping at the vehicle speed zero in the second to fourth stop areas Sb, Sc, and Sd is specified.

That is, the number of other vehicles stopping in the second to fourth stop areas Sb, Sc, and Sd, which are the areas other than the first stop area Sa where the own vehicle M is stopping, is counted, whereby the start priority ranking of the own vehicle M is specified. Other vehicles having entered the first to fourth driving areas Ta, Tb, Tc, and Td are judged that their start priority is lower than that of the own vehicle M, since they are approaching the intersection at a speed higher than the speed zero, or stopping in waiting for their turn to start because vehicles are stopping in the second to fourth stop areas Sb, Sc, and Sd.

Next, subtraction counting is started (step S4) until the specified number of other vehicles becomes zero, and the start order of the own vehicle M is judged (step S5). The steps S4 and S5 are repeated until the above specified number becomes zero.

In step S4, the subtraction counting is performed by subtracting the number of other vehicles that were once stopping and have started at a vehicle speed higher than zero. The number of other vehicles being zero indicates a state in which no other vehicle is stopping in any of the second to fourth stop areas Sb, Sc, and Sd.

When the number of other vehicles becomes zero, it is judged whether any other vehicle is present in the intersection area C (step S6). At this time, other vehicles in the intersection area C are recognized based on the image information transmitted from the IPU 23 to the front driving environment recognizer 24 and also based on the surrounding environment information transmitted from the first and second sensors 22c and 22d to the surrounding driving environment recognizer 26.

When there is no other vehicle in the intersection area C, it is judged whether there is any other vehicle in the own vehicle proceeding area Ma (step S7). Also at this time, other vehicles in the own vehicle proceeding area Ma are recognized based on the image information and the surrounding environment information.

Here, for example, to deal with a case where there exists another vehicle that ignores the traffic rule of the "4-WAY STOP" intersection, it is judged whether such a vehicle has entered the own vehicle proceeding area Ma. The processing in step S7 is repeated until it is judged that no other vehicle is present in the own vehicle proceeding area Ma.

When there is no other vehicle in the own vehicle proceeding area Ma, start permission is given to the own vehicle M that is stopping (step S8).

Note that in step S6, in a case where there is another vehicle in the intersection area C, it is judged whether the other vehicle in the intersection area C is an oncoming vehicle (step S9). Also in this processing, based on the image information and the surrounding environment information, it is recognized whether the other vehicle in the intersection area C is an oncoming vehicle.

When the other vehicle in the intersection area C is an oncoming vehicle, it is judged whether the oncoming vehicle is present in the oncoming vehicle proceeding area O (step S10). That is, when the oncoming vehicle has entered the oncoming vehicle proceeding area O, it is judged that the oncoming vehicle is traveling straight. Also at this time, it is recognized whether the oncoming vehicle is present in the oncoming vehicle proceeding area O based on the image information and the surrounding environment information.

When the oncoming vehicle is present in the oncoming vehicle proceeding area O, start permission is given to the own vehicle M that is stopping (step S8). That is, when the oncoming vehicle enters into the oncoming vehicle proceeding area O, the own vehicle M will not collide with or make contact with the oncoming vehicle even when the own vehicle M enters into the own vehicle proceeding area Ma.

Note that in step S9, when the other vehicle in the intersection area C is not an oncoming vehicle, the process returns to the processing in step S6. That is, it is judged that another vehicle, which is not an oncoming vehicle, is present in the intersection area C and has not passed through (exited from) the intersection.

In addition, in step S10, when the oncoming vehicle is not present in the oncoming vehicle proceeding area O, the process returns to the processing in step S6. That is, it is judged that the oncoming vehicle is present in a certain area other than the oncoming vehicle proceeding area O in the intersection area C, and that the oncoming vehicle has not passed through (exited from) the intersection or is in a state of making a right or left turn drive rather than traveling straight.

With the start permission given in step S8, the automatic driving controller 25 may perform predetermined control on the brake controller 32 and the acceleration/deceleration controller 33 to make the own vehicle M automatically start to travel, or may drive a notifying tool such as sound or visual indication so that the start permission sign makes the driver recognize the given start permission.

The above embodiment exemplifies the configuration in which the driving environment is recognized by using the stereo image of the two cameras, that is, the first and second cameras 22a and 22b. However, the stereo image may not be absolutely necessary, and the configuration may be such that the movement of other vehicles is recognized from an image of a monocular camera.

Further, the control for detecting the states of other vehicles may use only image information of a camera, or may be configured to combine pieces of surrounding environment information of sensing devices such as millimeter-wave radar, laser radar, and Light Detection and Ranging (LIDER).

Note that a road of the right-side driving regulation applied in the United States of America and other countries, is exemplified herein, and it goes without saying that the above-discussed embodiment can be applied to a case of a road of the left-side driving regulation.

As described thus far, according to the present embodiment, it is possible to constitute the automatic driving support system 1 that is able to judge whether to start an own vehicle based on the intersection traffic rule referred to as "4-WAY STOP" applied in the United States of America and other countries. In one embodiment, the automatic driving support system 1 may serve as an "intersection start judgment device".

The control of start permission for an own vehicle at a "4-WAY STOP" intersection by the intersection start judgment device may be applied not only to the automatic driving support but also applied to a driver assistance function.

The movement of other vehicles entering the intersection may be judged by the blinking of a blinker when making a right or left turn, or may be judged by a vehicle management system using cloud data transmitted from the other vehicles.

The map locator calculator 12, the automatic driving controller 25 and the front driving environment recognizer 24 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the automatic driving controller 25. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the modules illustrated in FIG. 1.

Although the embodiment of the technology have been described in the foregoing by way of example with reference to the accompanying drawings, the technology is by no means limited to the embodiment described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. An intersection start judgment device of a vehicle, the vehicle comprising a brake controller and an acceleration/deceleration controller for automatic driving support, the intersection start judgment device comprising:
at least one autonomous sensor disposed on the vehicle and configured to detect a driving environment in front of the vehicle, wherein the at least one autonomous sensor includes an image-capturing unit configured to capture an image of the driving environment; and
circuitry configured to:
recognize, using the at least one autonomous sensor, the driving environment of the vehicle;
calculate a location of the vehicle using map information and a global navigation satellite system;
determine, based on the map information and the location of the vehicle, that the vehicle approaches a four-way stop intersection at which a first road and a second road intersect one another, wherein the first road and the second road differ from each other, wherein the first road and the second road each is a two-lane road including a first lane in a first direction and a second lane in a second direction opposite the first direction, and wherein the vehicle travels on the first lane of the first road;
recognize an intersection area of the four-way stop intersection based on the map information, wherein the intersection area is a quadrilateral shaped area in the four-way stop intersection where the first road overlaps the second road;
recognize an oncoming vehicle proceeding area in the recognized intersection area based on the map information and the captured image, wherein the oncoming vehicle proceeding area is an area where the second lane of the first road overlaps the first lane of the second road, wherein the second lane of the first road is to be traveled by oncoming traffic, and wherein the first lane of the second road is located closer to the stop area for the vehicle than the second lane of the second road;
in response to determining that the vehicle approaches the four-way stop intersection, determine whether the vehicle stops at the stop area of the four-way stop intersection;

upon determining that the vehicle stops at the stop area of the four-way stop intersection, recognize another vehicle in the four-way stop intersection;
when the recognized another vehicle in the four-way stop intersection is determined to be a vehicle not traveling in the second lane of the first road, determine that the vehicle is unable to start while the recognized another vehicle is in the intersection area of the four-way stop intersection, and determine that the vehicle is able to start when the another vehicle exits the intersection area of the four-way stop intersection; and
when the recognized another vehicle in the four-way stop intersection is determined to be an oncoming vehicle that is traveling in the second lane of the first road, determine that the vehicle is unable to start i) while the recognized another vehicle is in the intersection area of the four-way stop intersection or ii) until the recognized another vehicle enters the oncoming vehicle proceeding area of the four-way stop intersection, and determine that the vehicle is able to start i) when the recognized another vehicle exits the intersection area without passing through the oncoming vehicle proceeding area of the four-way stop intersection or ii) when the recognized another vehicle enters the oncoming vehicle proceeding area.

2. The intersection start judgment device according to claim 1, wherein the at least one autonomous sensor is a radar sensor configured to detect the driving environment.

3. An intersection start judgment device of a vehicle, the vehicle comprising a notifying tool, the intersection start judgment device comprising:
at least one autonomous sensor that is disposed on the vehicle and configured to detect a driving environment in front of the vehicle, the at least one autonomous sensor includes an image-capturing unit configured to capture an image of the driving environment; and
recognize, with the at least one autonomous sensor, the driving environment of the vehicle;
calculate a location of the vehicle with map information and a global navigation satellite system;
determine, based on the map information and the location of the vehicle, that the vehicle approaches a four-way stop intersection at which a first road and a second road intersect one another, wherein the first road and the second road differ from each other, wherein the first road and the second road each is a two-lane road including a first lane in a first direction and a second lane in a second direction opposite the first direction, and wherein the vehicle travels on the first lane of the first road;
recognize an intersection area of the four-way stop intersection based on the map information, wherein the intersection area is a quadrilateral shaped area in the four-way stop intersection where the first road overlaps the second road;
recognize an oncoming vehicle proceeding area in the recognized intersection area based on the map information and the captured image, wherein the oncoming vehicle proceeding area is an area where the second lane of the first road overlaps the first lane of the second road, wherein the second lane of the first road is to be traveled by oncoming traffic, and wherein the first lane of the second road is located closer to the stop area for the vehicle than the second lane of the second road;

in response to determining that the vehicle approaches the four-way stop intersection, determine whether the vehicle stops at the stop area of the four-way stop intersection;

upon determining that the vehicle stops at the stop area of the four-way stop intersection, recognize another vehicle in the four-way stop intersection;

when the recognized another vehicle in the four-way stop intersection is determined to be a vehicle not traveling in the second lane of the first road, determine that the vehicle is unable to start while the recognized another vehicle is in the intersection area of the four-way stop intersection and determine that the vehicle is able to start when the another vehicle exits the intersection area of the four-way stop intersection; and when the recognized another vehicle in the four-way stop intersection is determined to be an oncoming vehicle that is traveling in the second lane of the first road, determine that the vehicle is unable to start i) while the recognized another vehicle is in the intersection area of the four-way stop intersection or ii) until the recognized another vehicle enters the oncoming vehicle proceeding area of the four-way stop intersection, and determine that the vehicle is able to start i) when the recognized another vehicle exits the intersection area without passing through the oncoming vehicle proceeding area of the four-way stop intersection or ii) when the recognized another vehicle enters the oncoming vehicle proceeding area; and when the vehicle is determined to be able to start, control the notifying tool to output sound or visual indication notifying that the vehicle k able to start.

4. The intersection start judgment device according to claim 3, wherein the at least one autonomous sensor is a radar sensor configured to detect the driving environment.

* * * * *